Figure 1:
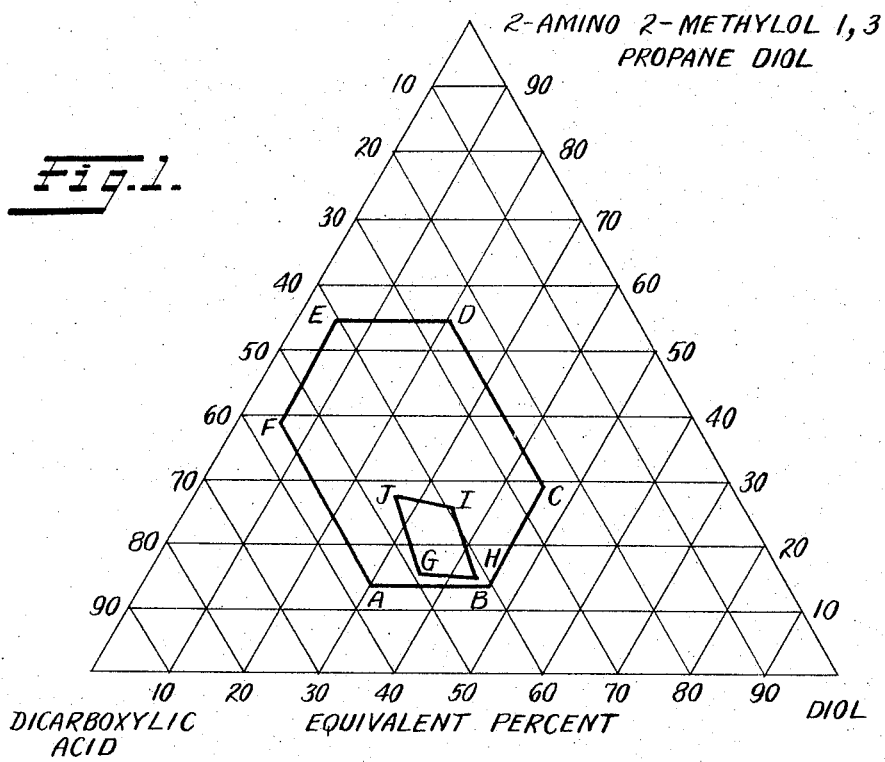

INVENTORS
RICHARD J. MARSHALL
JACK S. SKINNER

United States Patent Office 3,366,591
Patented Jan. 30, 1968

3,366,591
THIXOTROPIC SOLUTIONS OF COPOLYESTERS BASED ON 2-AMINO 2-METHYLOL 1,3-PROPANE DIOL UTILIZING DIMETHYL AMIDE SOLVENTS
Richard J. Marshall, Chalfont Borough, and Jack S. Skinner, Pittsburgh, Pa., assignors, by mesne assignments, to Mobil Oil Corporation, a corporation of New York
Filed Feb. 16, 1965, Ser. No. 433,063
11 Claims. (Cl. 260—32.6)

The present invention relates to copolyesters useful in the production of insulating coatings and especially to organic solvent solution coating compositions useful for the coating of various substrates, but especially aluminum and copper, and particularly thixotropic solutions having improved capacity for adhering to the edges of a foil.

In accordance with the invention, copolyesters are prepared by the polyesterification of three components consisting essentially of: (1) aromatic dicarboxylic acid component; (2) a diol component; and (2) 2-amino 2-methylol, 1,3-propane diol. The polyester product is an organic solvent-soluble copolyester which cures to provide tough and flexible heat-resistant films possessing excellent dielectric properties and which are strongly adherent to an underlying substrate, especially one composed of aluminum or copper. In accordance with a feature of the invention, the copolyester is dissolved in an amount of at least about 30% by weight of the solution in an organic solvent consisting essentially of a dimethyl amide to provide, after the solution is permitted to stand, a false body or thixotropy which enhances application properties, especially from the standpoint of covering the edge of a foil or strip.

The first essential component of the copolyester is an aromatic dicarboxylic acid, a term intended to broadly denote the use of acids, anhydrides, or their corresponding esters and diesters. The preferred acids are those which, with ethylene glycol, have the capacity of forming high molecular weight, cold-drawable homopolyesters. The acids which are particularly preferred are selected from the group of isophthalic acid, terephthalic acid, benzophenone dicarboxylic acid and mixtures thereof. Benzophenone dicarboxylic acid has the formula:

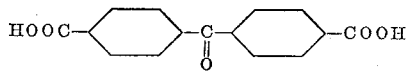

The second essential component of the copolyester is aliphatic diol containing from 2–10 carbon atoms. Various aliphatic hydrocarbon diols may be used, including cycloaliphatic diols, the preferred diol being ethylene glycol. 1,4-butane-diol; 1,5-pentanediol; and 1,4-butene-2-diol illustrate other preferred diols for use alone or together with ethylene glycol. Other diols which may be used are illustrated by 1,2-propanediol; 1,3-propanediol; 1,6-hexanediol; 1,3-cyclobutane diol; 1,4-cyclohexane diol; 1,4-cyclohexane dimethanol, etc. The preferred diols are straight chain diols having from 2–5 carbon atoms and two primary hydroxy groups.

The copolyesters of the invention consist essentially of the three components identified hereinbefore and the proportions of these components are critically interrelated. From the broad standpoint, the copolyesters consist essentially of:

(A) From 25–26 equivalent percent, preferably 40–49 percent of the defined dicarboxylic acids or their esters;
(B) From 6–46 equivalent percent, preferably 26–43 percent of the defined aliphatic diols; and
(C) From 13–54 equivalent percent, preferably 15–28 percent of 2-amino 2-methylol 1,3-propane diol.

The above broad indication of proportions is not adequate to identify the components which are used in the invention and the only feasible way of accurately defining proportions is graphically. This technique has been adopted in the triangulation presented herewith in which the effective proportions in accordance with the invention are defined as falling within the closed area A–B–C–D–E–F–A and the preferred proportions as falling within the closed area G–H–I–J–G.

A portion, up to about 50% by weight, of the amino component can be constituted by any polyhydric alcohol having at least three hydroxyl groups, such as glycerin; pentaerythritol; 1,1,1-trimethylolethane; 1,1,1-trimethylolpropane; sorbitol, mannitol; dipentaerythritol; diglycerol, etc., but this is not preferred since the amino component is important to the achievement of the desired properties of temperature resistance, flow, wetting, adhesion and thixotropy.

The term "equivalent percent" designates the percentage computed for each reactant in accordance with the formula:

$$\text{Equivalent Percent of Reactant} = \frac{100 \times \text{Equivalents of Reactant}}{\text{Total Equivalents}}$$

in which the number of equivalents of any reactant is normally determined by the number of moles of the reactant multiplied by the number of functional groups present in the reactant, i.e., two for phthalic acid and two for ethylene glycol.

The functionality of 2-amino 2-methylol 1,3-propane diol is somewhat curious. As will be seen, the amino group and one of the hydroxy groups are both tied up by a single carboxyl group so that the amino compound functions as though it has only three functional groups in the environment of this invention despite the presence of four functional groups in the compound. Thus, the amino compound is assigned a functionality of three herein.

Thus, the reaction of the amino compound with the acid appears to involve the interreaction between one of the carboxyl groups of the acid with both the amine groups and one of the hydroxy groups on the 2-amino 2-methylol 1,3-propane diol to form an oxazoline ring by the reaction (possibly involving two stages) diagramed below:

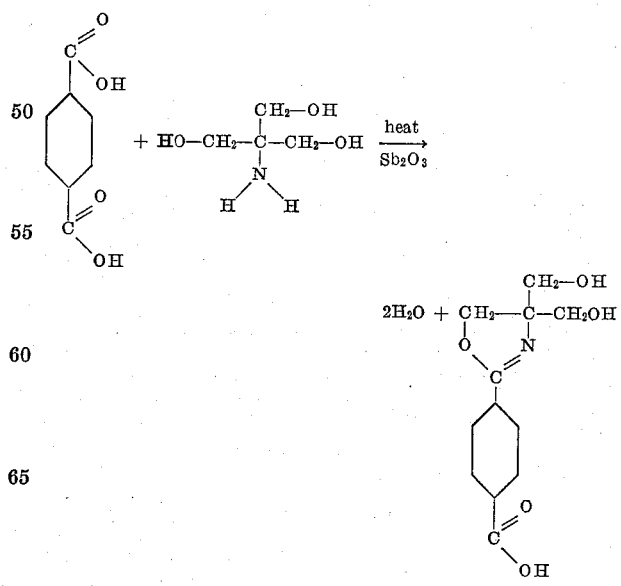

The components of the copolyester may be reacted together in any desired fashion. When starting directly from the iso- or terephthalic acid instead of the dimethyl ester thereof, the reaction is desirably effected in the presence of an esterification catalyst, there being numerous metal ions such as titanium, tin, and the like which are known to be useful in the reaction. The invention will be illustrated using antimony trioxide as the esterification catalyst since this constitutes presently preferred practice. On the other hand, it will be appreciated that, and while it is less preferred from various standpoints including the cost of raw material, the copolyesters may be produced by transesterification instead of direct esterification in which event conventional transesterification catalysts would be employed.

The copolyesters found to be useful in accordance with the invention have a specific viscosity (relative viscosity minus 1.0) measured at 77° F. in a 1 gram per deciliter solution in a solvent mixture containing 60 parts of phenol to 40 parts of tetrachloroethane of at least about 0.25. It has been found that from the standpoint of overall properties, it is preferred to employ copolyesters having a specific viscosity as indicated hereinbefore in the range of from 0.30–0.50. Higher specific viscosities up to about 0.80 may be used, but viscosities of approximately 0.40 are most practical.

Relative viscosity is determined in an Ostwald-Fenske viscosimeter and is computed as follows:

$$\text{Relative viscosity} = \frac{\text{Solution efflux time}}{\text{Solvent efflux time}}$$

The relative viscosity is thus obtained by direct measurement. Specific viscosity may be derived by subtracting 1.0 from the relative viscosity.

The copolyesters are conveniently produced by a single stage reaction conducted in the presence of effective esterification catalysts at temperatures in the range of from 200 up to about 230° C.

As a matter of interest, the invention in using 2-amino 2-methylol 1,3-propane diol employs, essentially, a trifunctional material to replace trifunctional glycerin and the like in a diol-triol-diacid type of copolyester. Corresponding results are not obtained when the diol component of the same type of copolyester is replaced by 2-amino 2-ethyl 1,3-propane diol which is an essentially difunctional material. When the diol component, such as ethylene glycol is replaced instead of the triol component, the product does not have equivalent physical properties (the desirable flexibility of the product is impaired) and, moreover, organic solvent solutions in a dimethyl amide are not thixotropic.

In order to form the preferred thixotropic solutions in accordance with the invention, the copolyester is dissolved in a dimethyl amide solvent which, from the standpoint of convenience, may be the solvent used to thin the copolyester product which is produced by the hot melt copolyesterification normally employed. It is essential in accordance with the invention that a dimethyl amide solvent be employed for, otherwise, the desired thixotropy is not obtained. In this respect dimethyl acetamide is outstanding in its performance though dimethyl formamide is also effective in providing the preferred thixotropic solutions.

It is of interest to note that the desired thixotropy builds up over a period of time until the solution achieves a putty-like consistency. The consistency of the putty reaches an equilibrium in a period of within two days and does not significantly vary from this consistency for several months, after reaching equilibrium. The desired putty consistency is best measured under shearing conditions and a specific test for determining consistency will be described hereinafter.

It would appear that the thixotropy achieved in the invention is the result of hydrogen bonding involving the hydroxy groups of the copolyester and the amide structure of the dimethyl amide. Thus, the copolyester itself shows an infrared spectograph peak at 3550 A. indicative of the presence of hydroxyl groups. This peak shifts to 3430 A. when the copolyester is placed in solution in dimethyl formamide and to 3380 A. when the copolyester is placed in solution in dimethyl acetamide. These shifts indicate that hydrogen bonding is the basis for thixotropy.

Thixotropy is also a function, in part, of resin solids content. As a practical matter the coating solution should include at least 20% by weight of resin solids, but it is preferred to employ at least 35% of resin solids and approximately 45% of resin solids illustrates a typical coating solution preferred in accordance with the invention.

While the dimethyl amide solvents yield thixotropic solutions, the copolyesters of the invention are soluble in commercial cresylic acids and mixtures thereof with aromatic hydrocarbons and can be applied from such solvent solutions, though these solutions are not thixotropic.

As will be appreciated the thixotropy attributes of the solutions of the invention are particularly important when one desires to insure coverage of the edge of a sheet or foil. On the other hand, running and sagging of coatings is always a problem to one extent or another and, even in the absence of the thixotropic rheology achieved by the invention, the ability to provide coating solutions having good flow properties and which will deposit films having excellent dielectric properties and which cure to provide heat-resistant flexible coatings strongly adherent to copper and aluminum is always important.

The invention is useful wherever electric insulation is desired coupled with reasonable resistance to elevated temperature. As has been explained, the thixotropic solutions provided by the invention provide excellent application properties enabling foil such as aluminum or copper foil to be coated while obtaining good edge coverage around the edges of the foil. On the other hand, the invention is also useful when applied to aluminum or copper wire in which the achievement of smooth and uniform films is highly desirable even though there are no sharp edges to be covered. Similarly, impregnated fabrics are frequently used as slot liners or conductor sleeves, especially impregnated glass cloth. Here, it is important that the impregnating solution uniformly fill the interstices of the fabric and smoothly cover and the non-uniform surface of the fabric and the solutions of the invention are well adapted for this purpose.

The copolyesters of the invention, while having some capacity to cure in the absence of extraneous catalysts, are normally cured in the presence of a curing agent or catalytic material. Thus, and being hydroxyl-functional polyesters, any agent capable of reacting with the hydroxyl group can be used as a curing agent and these may be typified by organic diisocyanates. It is preferred to employ a curing catalyst which provides a small proportion of metal in solution, especially compounds in which the soluble metal is provided by an acetylacetonate or an octoate. These may be illustrated by zinc acetylacetonate and magnesium octoate in an amount to provide 0.75 part of zinc or magnesium metal per 100 parts of copolyester resin to be cured.

The coatings of the invention are baked to cure the same, appropriate baking temperatures ranging from 300–650° F., for period of time from 15 seconds at the highest temperatures to from 15–20 minutes at the lowest baking temperature.

The specific test which is used for determining the viscosity of the viscous putty-like materials provided by the invention is as follows:

Two equal weight heavy glass plates and a brass weight are utilized in the test (the brass weight plus one of the glass plates should equal 2.5 kilograms). The test should be carried out on a level surface while the glass plates and the test specimen are at room temperature (77° F.).

Five grams of the specimen are weighed onto the center of one of the glass plates. The second glass plate is then placed on the weighed sample with the brass weight on top. The brass weight is removed at the end of exactly one minute. The spread of the material is measured by placing both glass plates over a previously prepared concentric ring chart (concentric rings are ⅛ inch apart) and reading at north, south, east and west positions to the closest ring. Starting from the center, each ⅛ inch is assigned a value of 2.5 points and the chart read in points and averaged. Typical values for preferred compositions in the invention are from 30–40 points.

Figure 2:
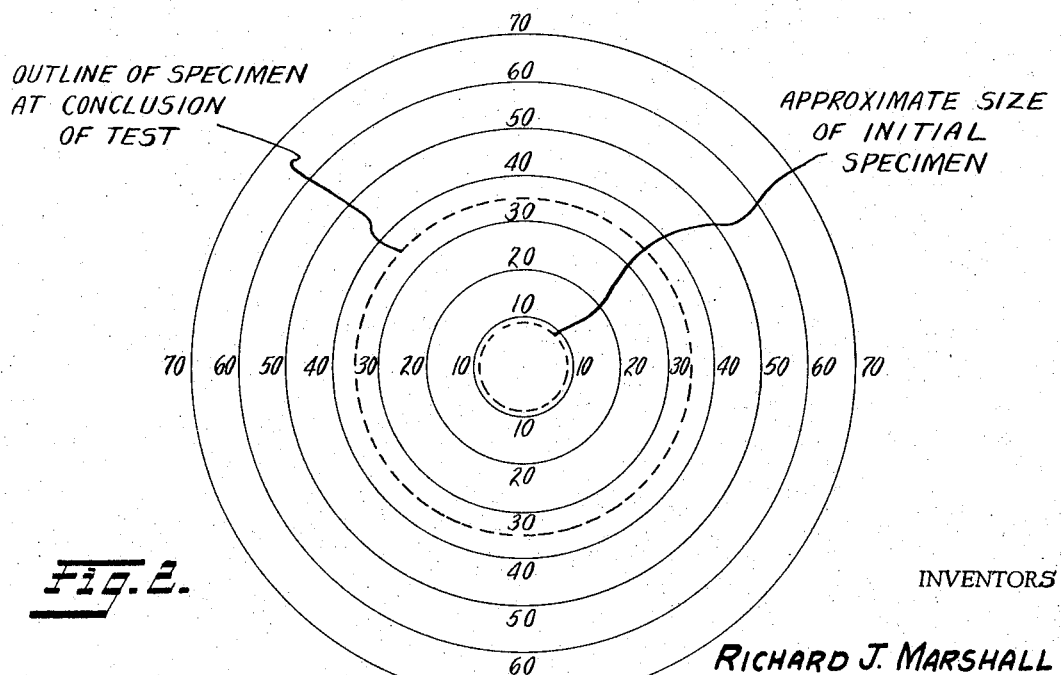

To avoid any question, a typical concentric ring chart with values in points is shown in FIG. 2 with the initial and final dimensions of the test specimen being illustrated by dotted lines.

The invention is illustrated in the examples which follow (all parts by weight):

EXAMPLE I

*Production of copolymer and coating solution*

CHARGE COMPOSITION

| | |
|---|---|
| (1) Ethylene glycol | 9.35 |
| (2) Terephthalic acid | 31.25 |
| (3) Antimony trioxide | 0.12 |
| (4) 2-amino 2-methylol 1,3-propane diol | 7.97 |
| (5) Aromatic hydrocarbon solvent (boiling range of 145–195° C.) | 5.00 |
| (6) Dimethyl acetamide | 44.99 |
| (7) Zinc acetylacetonate | 1.32 |
| | 100.00 |

PROCEDURE OF PREPARATION

The ethylene glycol and terephthalic acid are charged into a kettle equipped with a packed column for reflux and the charge is initially heated to a temperature of 180–200° F. whereupon the antimony trioxide esterification catalyst and the 2-amino 2-methylol 1,3-propane diol are charged and heating is continued until refluxing begins at a temperature of about 345° F. Heating is then continued maintaining a head temperature in the packed column of 208–218° F. Refluxing is continued and any glycol lost is replaced. The reaction is continued with a pot temperature in the range of 425–430° F. until a product is obtained having an acid value of from 18–22 and a specific viscosity tested as reported hereinbefore, of from 0.30–0.40.

The specific viscosity is important since the higher the specific viscosity, the greater is the thixotropy which is developed later upon standing and after association with an appropriate solvent.

The packed column is then replaced with an unpacked column and 5 parts of the aromatic hydrocarbon solvent are added to the kettle. The product is then cooled to 300° F. and 44.99 parts of dimethyl acetamide are added and cooling continued until the solution has a temperature from 160–180° F. whereupon 1.32 parts of zinc acetylacetonate are added and the product is then pumped to storage in drums.

As previously indicated, the product is a solution which is not thixotropic, but thixotropy develops on standing in the drums until, after about two days, the product will not thicken significantly more than it has already thickened by that time. The extent of thixotropy which is developed can be treated as indicated hereinbefore.

EXAMPLE II

The thixotropic solution of Example I (after standing two days to provide a solution having the approximate consistency of a heavy grease) is applied to aluminum foil 33 mils in thickness and 8½ inches in width. The foil is coated simultaneously on both sides to provide a total build of dry film of from 1 to 1.5 mils. This total build is achieved using 3 coatings on each side. After the application of each coating, the coated foil is baked for 10 minutes at 400° F. The resin forms a protective bead at the edge of the foil which possesses excellent dielectric strength. The baked coating exhibits excellent solvent resistance as demonstrated by the fact that 100 double rubs with a methyl ethyl ketone-soaked cloth fails to remove it, and the coating exhibits excellent adhesion to the base as demonstrated by the standard Scotch tape adhesion test in which the coating is scored through to the substrate in an X and then Scotch tape is applied and removed without removing any of the coating. The cured coating also shows good thermal stability, meeting the requirements for Class F insulation and flexibility is quite good, e.g., the product can be bent 180° without fracturing. Application properties are excellent from the standpoint that the wet coating shows no tendency to crawl or eyehole and coverage at the edge is excellent as previously noted.

It will be understood that the invention is not limited to the specific formulas and ingredients recited in the foregoing examples and that pigments, dyes, waxes and other similar ingredients may be added to the otherwise clear compositions to provide decorative and similar effects without departing from the scope of the invention.

The invention is defined in the claims which follow.

We claim:

1. A viscous putty-like thixotropic solution comprising an organic solvent medium consisting essentially of an amide selected from the group consisting of dimethyl acetamide and dimethyl formamide, said organic solvent medium having dissolved therein at least 20% by weight, based on the total weight of solution, of organic solvent-soluble copolyester consisting essentially of the copolyesterification reaction product of:
   (A) aromatic dicarboxylic acid;
   (B) aliphatic diol containing from 2–10 carbon atoms; and
   (C) 2-amino 2-methylol 1,3-propane diol, the equivalent proportions of said components (A), (B) and (C) being defined by the closed area A–B–C–D–E–F–A in the accompanying triangulation, said copolyester having a specific viscosity in the range of from about 0.25 to about 0.80, viscosity being measured at 77° F. in a 1 gram per deciliter solution in a solvent mixture of 60 parts of phenol to 40 parts of tetrachlorethane.

2. The solution of claim 1 in which said aromatic dicarboxylic acid is selected from the group consisting of isophthalic acid, terephthalic acid, benzophenone dicarboxylic acid and mixtures thereof.

3. The solution of claim 2 in which said diol is a straight chain diol having from 2–5 carbon atoms and two primary hydroxyl groups.

4. The solution of claim 3 in which the equivalent proportions of said components (A), (B) and (C) are defined by the closed area G–H–I–J–G in the accompanying triangulation.

5. The solution of claim 1 in which said reaction product is formed by the copolyesterification of terephthalic acid, ethylene glycol and 2-amino 2-methylol 1,3-propane diol.

6. The solution of claim 1 in which said copolyester has a specific viscosity in the range of from 0.30–0.50, measured as indicated.

7. A foil selected from the group consisting of copper foil and aluminum foil and having a continuous coating adhered on all surfaces thereof including the edges of said foil, said coating comprising a baked film of the solution of claim 1.

8. A method of coating copper and aluminum foil to provide a heat-resistant coating thereon including the edges of said foil comprising simultaneously applying to opposite surfaces of said foil the thixotropic solution of claim 1.

9. The solution of claim 1 in which said organic solvent medium consists essentially of dimethyl acetamide.

10. The solution of claim 1 having a thixotropy yielding a spreading value of from 30–40 points when measured by the test referred to herein.

11. A viscous putty-like thixotropic solution comprising an organic solvent medium consisting essentially of dimethyl acetamide and having dissolved therein at least 35% by weight, based on the total weight of solution, of organic solvent-soluble copolyester consisting essentially of the copolyesterification reaction product of:
- (A) aromatic dicarboxylic acid selected from the group consisting of isophthalic acid, terephthalic acid, benzophenone dicarboxylic acid and mixtures thereof;
- (B) straight chain aliphatic diol containing from 2–5 carbon atoms and two primary hydroxyl groups; and
- (C) 2-amino 2-methylol 1,3-propane diol, the equivalent proportions of said components (A), (B), and (C) being defined by the closed area G–H–I–J–G in the accompanying triangulation, said copolyester having a specific viscosity in the range of from 0.30–0.50, viscosity being measured at 77° F. in a 1 gram per deciliter solution in a solvent mixture of 60 parts of phenol to 40 parts of tetrachlorethane, said solution having a thixotropy yielding a spreading value of from 30–40 points when measured by the test referred to herein.

References Cited

UNITED STATES PATENTS

| | | | |
|---|---|---|---|
| 2,899,408 | 8/1959 | Caldwell et al. | 260—32.6 |
| 2,925,404 | 2/1960 | Caldwell et al. | 260—32.6 |

FOREIGN PATENTS

| | | |
|---|---|---|
| 622,245 | 9/1962 | Belgium. |
| 1,353,755 | 2/1964 | France. |

OTHER REFERENCES

Bjorksten: Polyesters and Their Applications; Reinhold Publishing Corp.; 1956; pp. 182–183; Scientific Library TP 986. p6 B5.

MORRIS LIEBMAN, *Primary Examiner.*

L. T. JACOBS, *Assistant Examiner.*

UNITED STATES PATENT OFFICE
CERTIFICATE OF CORRECTION

Patent No. 3,366,591                         January 30, 1968

Richard J. Marshall et al.

It is hereby certified that error appears in the above numbered patent requiring correction and that the said Letters Patent should read as corrected below.

Column 1, line 21, for "(2)" second occurrence, read -- (3) --; line 22, for "methylol," read -- methylol --; line 57, for "1,4-cyclophexane" read -- 1,4-cyclohexane --; line 66, for "25-26" read -- 25-56 --; column 4, line 41, strike out "and" second occurrence.

Signed and sealed this 1st day of April 1969.

(SEAL)
Attest:

Edward M. Fletcher, Jr.                         EDWARD J. BRENNER
Attesting Officer                               Commissioner of Patents